United States Patent [19]

Morimoto et al.

[11] 4,422,716

[45] Dec. 27, 1983

[54] OPTICAL FIBER CONNECTOR

[75] Inventors: Yoshitaka Morimoto; Tomiji Shiga; Akio Ushirogawa, all of Tokyo, Japan

[73] Assignee: Nippon Electric Co., Ltd., Tokyo, Japan

[21] Appl. No.: 202,631

[22] Filed: Oct. 31, 1980

[30] Foreign Application Priority Data

Nov. 21, 1979 [JP] Japan .................. 54-151174

[51] Int. Cl.³ .................................... G02B 7/26
[52] U.S. Cl. ................................. 350/96.21
[58] Field of Search ............... 350/96.20, 96.21

[56] References Cited

U.S. PATENT DOCUMENTS

| 4,080,044 | 3/1978 | Gousseau | 350/96.21 |
| 4,181,402 | 1/1980 | Borsuk et al. | 350/96.21 |
| 4,198,119 | 4/1980 | Uberbacher | 350/96.2 |
| 4,205,897 | 6/1980 | Stankos | 350/96.21 |
| 4,268,115 | 5/1981 | Slemon et al. | 350/96.21 |

Primary Examiner—Eli Lieberman
Attorney, Agent, or Firm—Laff, Whitesel, Conte & Saret

[57] ABSTRACT

An optical fiber connector includes a cable with an optical fiber and a tube for containing the fiber. The fiber is able to move freely and axially within the tube, and is secured by a device having an internal diameter substantially the same as that of the optical fiber. This securing prevents the axial movement of the fiber held inside the tube. The securing device also has a cylindrical bore for receiving the cable fixed to the securing means.

6 Claims, 3 Drawing Figures

OPTICAL FIBER CONNECTOR

The present invention relates to an optical fiber termination assembly and, more particularly, to an optical fiber connector for terminating an optical fiber included in a cable in which the optical fiber is movable in the axial direction of the cable.

Recent research and development of optical fiber communication systems have made their practical use with the improvements of optical fiber connectors for optical coupling between two optical fibers or between the optical fiber and another device (such as a laser).

One example of such a connector is disclosed in U.S. Pat. No. 4,166,672. This connector mutually connects two cables, each of which has an optical fiber composed of a core layer and a clad layer, and a tube for protecting the fiber from any external forces. More specifically, two types of cables are known hitherto as follows: One firmly supports the optical fiber by the tube, while the other retains the optical fiber so that it is movable along the center axis of the tube. The optical fiber cable of the latter type is sometimes called a "loose type cable".

Conventionally, the assembly of an optical connector using the cable of the first type was made comparatively easy since the optical fiber is fixedly retained inside of the tube. On the other hand, in the cable of the latter type, the assembly becomes complicated due to the use of such a movable fiber, degrading work efficiency.

An object of the present invention is, therefore, to provide an optical fiber cable termination assembly for a loose type, optical fiber cable which loosely holds an optical fiber within a tubular member thereof, thus enabling easy assembly work.

According to one aspect of the invention, there is provided an optical fiber cable termination assembly for use on a loose type of optical fiber cable. This type of optical fiber cable includes a fiber for transmitting a light beam and a protective tubular member for protecting the optical fiber, while enabling the fiber to move freely and axially therein. A forward part of the optical fiber protrudes from the end of the protective tubular member. A sleeve member abuts against the end of the protective tubular member for fixing a forward part of the optical fiber therein. An inner diameter of the sleeve member is dimensioned to be substantially equal to the corresponding outside dimension of the optical fibers. This fixes the optical fiber in the sleeve area so that it does not and cannot move into or out of the protective tubular member. A termination member has a cylindrical bore for receiving the optical fiber cable which is fixed to the sleeve member.

The present invention will be described in greater detail by referring to the accompanying drawings, wherein.

Figure 1:
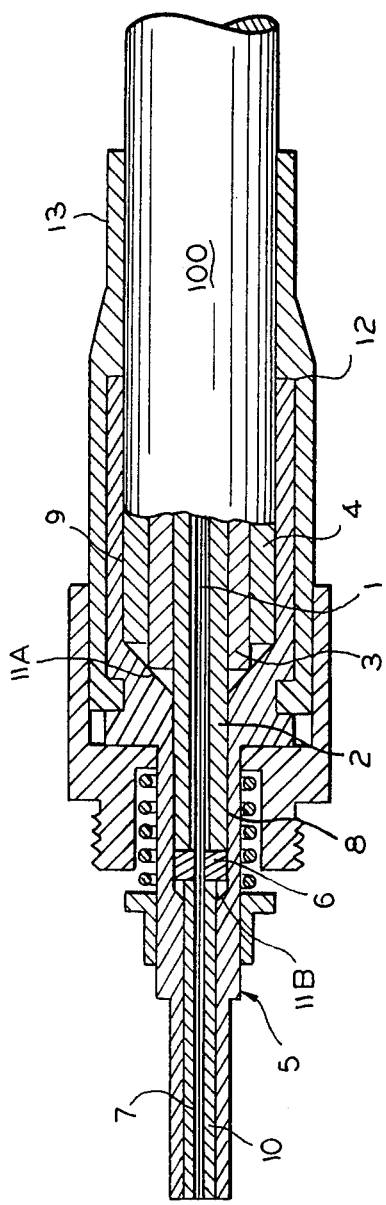
FIG. 1 is a cross sectional view of one embodiment of the present invention.
Figure 3:
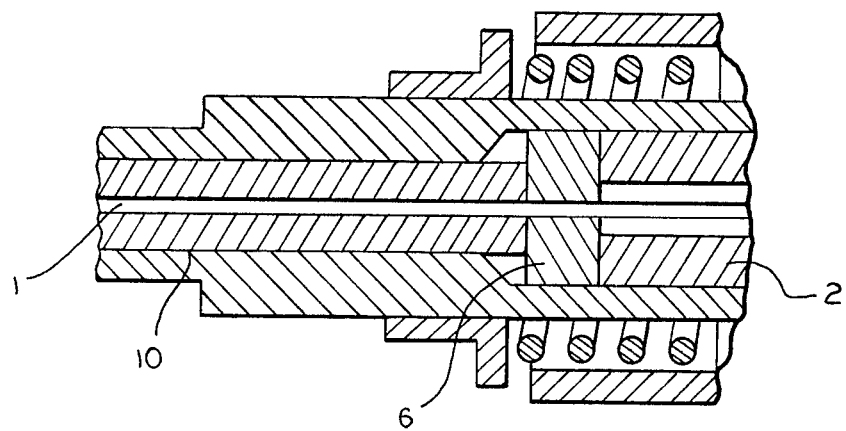
FIG. 3 is an enlarged portion of FIG. 1 showing the dimensional relationship between a sleeve and an optical fiber.

FIGS. 1 and 3 show a cable 100 for use in the present invention. More particularly, an optical fiber 1 enables a transmission of a light beam within a first protective tubular member 2, which loosely holds and protects the optical fiber. The fiber has a core layer and a clad layer. The protective tubular member 2 is generally made of nylon and has a diameter which is large enough to enable the free movement of the fiber 1, in the axial direction thereof. Coaxially arranged around the outer circumference of the protective tubular member 2 is a tension strength member 3, which is made of an organic synthetic fiber (such as a polyamide fiber) and which serves as a reinforcement against external tensile strength. An outer sheath 4 is made of vinyl chloride and serves as a reinforcement against the bending or compressing of the cable. A forward part of the optical fiber protrudes from the end of the protective tubular member. The tube 2, the member 3, and the sheath 4 are formed stepwise so as to allow a large contact area with a bore 9 of a termination member 5, as mentioned below in greater detail.

A sleeve member 6 made of glass is attached at the end of the tubular member 2 of the cable 100 by the use of an epoxy adhesivity agent (not shown) to prevent the fiber 1 from moving inside the tube 2. The glass sleeve member 6 has an inner diameter substantially the same as the diameter of the optical fiber 1 and an outer diameter substantially the same as that of the tube 2. The glass sleeve member 6 may be made of other metallic or non-metallic materials which have the adhesivity property.

The termination member 5 made of stainless steel has a first bore 7 for supporting the fiber 1, a second bore 8 for retaining the glass sleeve member 6, and a third bore 9 for receiving the tube 2, the member 3, and the outer sheath 4. The bores 7 and 8 are continuously formed as shown in FIG. 1. The first bore 7 receives a glass tube 10 which has a diameter substantially the same as the fiber 1 so as to tightly secure the fiber 1. Accordingly, the diameter of the optical fiber fills the almost entire inner space of the glass tube 10 and sleeve member 6 and loosely extends (with the same diameter as the above-mentioned space) into the protective tubular member 2. A surface 11A of the bore 9 and a surface 11B of the bore 8 are tapered to make it easy to insert the ends of the fiber and the cable with the sleeve member 6, respectively. This is because the fiber 1 may be broken when the tube 6 contacts a surface 11B before the outer sheath 4 contacts the surface 11A. A rubber sleeve member 13 is provided around the outer circumference of the termination member 5 to reduce and soften the force given, by the end 12 of the member 5, to the cable 100 due to the cable bending.

An assembling process of the present connector is now described in detail. The glass sleeve member 6 is bonded or fixed, by the use of an adhesivity agent (such as mythyl 2-cyanoacrylate) for instantaneous bonding to the fiber 1 and the tubular member 2 in the cable 100. The cable 100 having the above-mentioned stepped structure and with the member 6 fixed, is attached to the termination member 5 by the epoxy adhesivity agent. Finally, the glass tube 10 tightly supports the fiber 1 in the first bore 7 and is inserted into the member 5.

Figure 2:
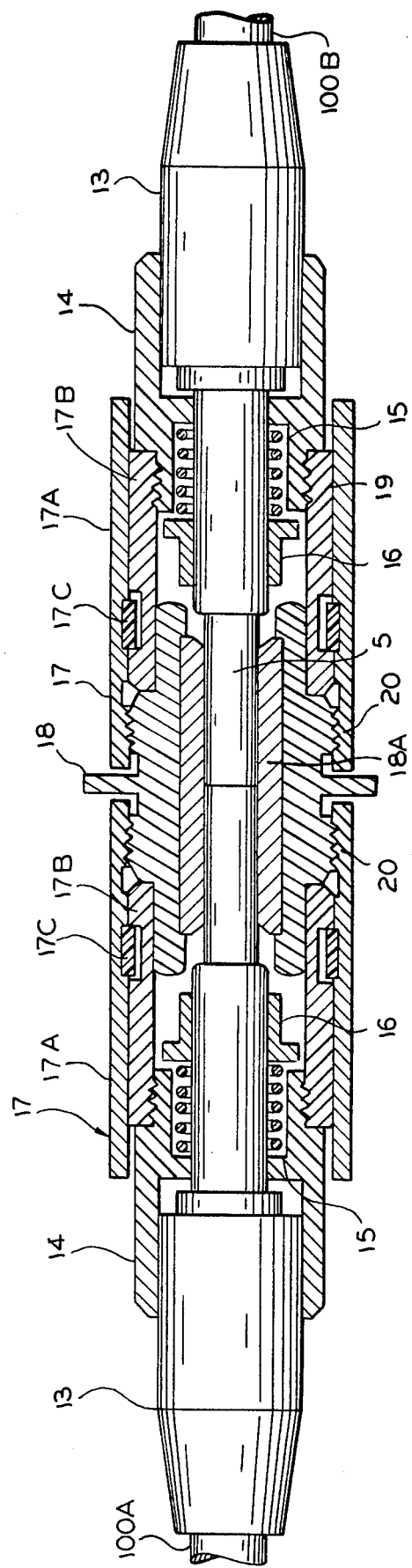
FIG. 2 is a diagram showing one application of the present invention.

Referring to FIG. 2, a housing 14 is placed over the rubber sleeve member 13. Spring coils 15 are disposed between the housing 14 and the termination member 5. Stoppers 16 are attached to prevent the coils 15 from jumping out of the housing 14. A housing 17 is made up of an external member 17A, an internal member 17B, and a ring 17C, so that the member 17A may be freely rotated around the outer circumference of the member 17B. The housing 17 is fixed to the housing 14 by means of a screw thread 19. An adapter 18, having a sleeve 18A to guide the termination member 5, is attached to the housing 17 by a screw thread 20.

The operation for coupling two optical fiber cables 100A and 100B using the present connector of FIG. 1 is described hereunder.

(1) The housing 14 is placed over the rubber sleeve member 13.

(2) After the springs 15 are attached, the stoppers 16 are attached to the member 5.

(3) The housing 17 is attached to the housing 14.

The above steps (1) to (3) are performed for each of the cables 100A and 100B, and the adapter 18 is attached to the housing 17 of the first cable 100A, and the adapter 18 is then attached to the second cable 100B, thus completing the interconnection of the cables 100A and 100B.

As mentioned above, when applied in attaching the optical cables to the termination member, the present invention makes work efficiency easier, since the sleeve member 6 abutting against an end of the protective tubular member 2 for fixing a portion of the forward part of the optical fiber prevents the movement of the optical fiber along the center axis.

What is claimed is:

1. An optical fiber cable termination assembly for an optical fiber cable comprising:

an optical fiber cable including at least one optical fiber for transmitting a light beam and a protective tubular member for protecting said optical fiber while enabling said optical fiber to move freely and axially therein, a forward part of said optical fiber protruding from the end of said protective tubular member:

a sleeve member abutting against the end of said protective tubular member for fixing a portion of said forward part of said optical fiber therein so that said forward part of said optical fiber does not move into or out of said protective tubular member, an inner diameter of said sleeve member being dimensioned to be substantially equal to the corresponding dimension of said optical fiber;

a glass tube for tightly retaining the remainder of said forward end of said optical fiber; and termination means having a first bore for receiving said glass tube, a second bore for receiving said sleeve member and a third bore for receiving a protective jacket for said optical fiber including said protective tubular member.

2. The optical fiber cable termination assembly of claim 1, wherein the front end faces of said termination means, said glass tube and said optical fiber have a coplanar surface.

3. The optical fiber cable termination assembly of claim 2, further comprising a tapered portion connecting said second bore to said third bore.

4. The optical fiber cable termination assembly of claim 3, wherein the end of said protective jacket has (is stripped in) a stepwise end (manner) to provide a large contact area with said tapered portion.

5. The optical fiber cable termination assembly of claim 4, wherein (a) the stepwise end of said protective jacket is bonded to said tapered portion.

6. The optical fiber cable termination assembly of claim 4, further comprising absorbing means formed coaxially around said termination means for absorbing the external force exerted by the bending of said optical fiber cable, and means connected to said absorbing means for coupling said connector to another connector having the same structure.

* * * * *